Sept. 20, 1949.  B. MARTIN  2,482,282
LINE FASTENER AND TIGHTENER
Filed Oct. 23, 1947
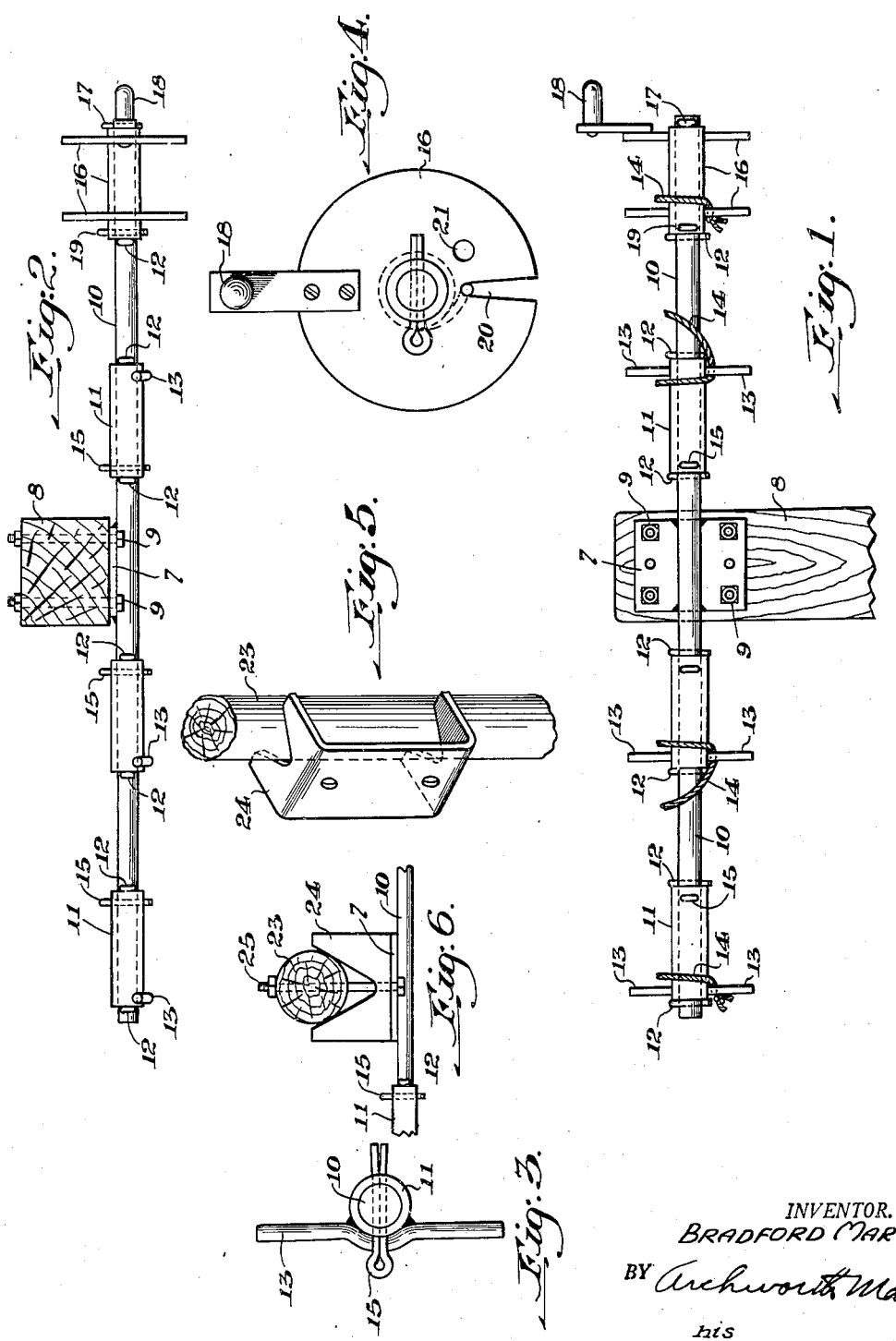
INVENTOR.
BRADFORD MARTIN.
BY Archworth Martin
his ATTORNEY.

Patented Sept. 20, 1949

2,482,282

UNITED STATES PATENT OFFICE 2,482,282

LINE FASTENER AND TIGHTENER

Bradford Martin, Washington, Pa.

Application October 23, 1947, Serial No. 781,611

2 Claims. (Cl. 211—119.15)

My invention has for its object the provision of a line-supporting and tensioning or tightening device that is particularly suitable for use with clothes lines and which, when attached to a post, will conveniently hold a considerable number of "reaches" or "stretches" of line, with provision for applying and maintaining a desired tension thereon. Also the device can conveniently support a clothes line reel or reels which may themselves constitute the line-supporting elements when the line is stretched or a reel can be used simply as a storage reel or spool.

In the accompanying drawing, Figure 1 is a face view of my line holder and tightener mounted upon a post; Fig. 2 is a plan view thereof; Fig. 3 is an end view of the structure of Fig. 1, on an enlarged scale; Fig. 4 is a view at the opposite end of the structure of Fig. 1, on an enlarged scale; Fig. 5 is a perspective view showing an adapter or bracket member for use when the line holder of Fig. 1 is to be applied to a circular post, and Fig. 6 is a plan view showing the manner in which the line-supporting device of Figs. 1 and 2 is attached to the bracket and post of Fig. 5.

Referring first to Figs. 1 to 4, the structure comprises a base plate 7 that will be mounted on a post 8 by means of bolts 9 that extend through the plate 7 and into or through the post. A tube or rod 10 is welded to the plate 7 and has a plurality of sleeves 11 rotatable thereon. The sleeves are held against shifting longitudinally of the shaft 10 by cotter pins 12 that extend through the shaft.

Fingers 13 are welded to the sleeves 11 and a line or lines 14 will be tied to or looped around these fingers, it being understood that the line may similarly be looped around another holder that is mounted on another post. At any rate, the sleeves 11 will be rotated by using the fingers 13 as handles, and when the line has been tightened sufficiently, pins 15 will be inserted through holes in the sleeves 11 and the bar 10, to hold the sleeves against turning under the tension of the line. The pins 15 can readily be removed when it is desired to release or disconnect the line. Also they may suitably be made in the form of cotter pins as shown in Fig. 3 with their inner ends normally sprung apart slightly so that they will have sufficient yieldability to be held in place, against accidental displacement.

On one end of the bar 10, a spool or reel 16 is releasably held by a pin 17, the reel being provided with a handle 18 by which it may be turned to wrap a line thereon either for merely tightening one end of the line or for storing the line after it has been disconnected from the sleeves 11 and the fingers 13. When in use on the bar, the reel will be held against turning, by a pin 19. When the pins 17 and 19 are removed, the reel with the line contained thereon can be taken indoors. The reel on one end plate has a tapered slot 20 and a hole 21 either of which will serve as a convenient means for connecting one end of a line thereto, simply by forming a knot on the end of the line, which will hold it against withdrawal through the hole 21 or through the slot 20.

The slot 20 is tapered so as to make it adaptable to ropes of various thicknesses. For example, the thinner ropes will engage with the radial walls of the slot at about the inner end thereof, while heavier ropes will wedge between the walls at some distance toward the outer end of the slot. In both cases, a knot in the extremity of the rope will, of course, hold the rope against being pulled out of the slot under line tension.

Referring now to Figs. 5 and 6, I show a manner in which the base plate 7 and the parts carried thereby can be attached to a round post 23. In this instance, a bracket or adapter 24 is provided, and when the base plate 7 is placed against the bracket 24, bolts 25 will be inserted through a pair of holes in the base plate and a pair of holes in the bracket, and also through the post 23.

I claim as my invention:

1. A line holder and tightener comprising a shaft, means for rigidly connecting the shaft to a support, sleeves rotatably mounted on the shaft, pins extending through the shaft and abutting the ends of the sleeves, a finger on each sleeve, for holding a line and serving as a handle for rotating the sleeve, and a hole through each sleeve and the shaft, receiving a pin for releasably holding the sleeve against rotation.

2. A line holder and tightener comprising a shaft, means for rigidly connecting the shaft to a support, sleeves rotatably mounted on the shaft, pins extending through the shaft and abutting the ends of the sleeves, a finger on each sleeve, for holding a line and serving as a handle for rotating the sleeve, and a hole through each sleeve and the shaft, receiving a pin for releasably holding the sleeve against rotation, the said finger extending crosswise of the sleeve and being welded intermediate its ends, to one side of the sleeve.

BRADFORD MARTIN.

REFERENCES CITED

The following references are of record in the file of this patent:

UNITED STATES PATENTS

| Number | Name | Date |
|---|---|---|
| 900,545 | Humiston | Oct. 6, 1908 |
| 1,023,972 | Starnes | Apr. 23, 1912 |
| 1,140,787 | Baeumle | May 25, 1915 |
| 1,324,112 | Giddings | Dec. 9, 1919 |
| 1,353,365 | Webb et al. | Sept. 21, 1920 |
| 1,513,445 | Cohrs | Oct. 28, 1924 |
| 2,399,070 | Swanson | Apr. 23, 1946 |
| 2,429,590 | Ames | Oct. 28, 1947 |